United States Patent [19]

Adam

[11] Patent Number: 4,777,972
[45] Date of Patent: Oct. 18, 1988

[54] HIGH PRESSURE WATER WASHING DEVICE

[75] Inventor: Michel Adam, Gambsheim, France

[73] Assignee: Polysar Financial Services S.A., Fribourg, Switzerland

[21] Appl. No.: 61,229

[22] Filed: Jun. 12, 1987

[30] Foreign Application Priority Data

Jul. 4, 1986 [FR] France ................................ 86 09753

[51] Int. Cl.$^4$ ................................................ B08B 3/02
[52] U.S. Cl. ..................................... 134/172; 134/177; 134/180; 198/493; 198/495
[58] Field of Search ....................... 134/172, 180, 177; 162/275, 277; 198/493, 495; 210/391, 393, 409, 411; 239/750, 752; 209/380

[56] References Cited

U.S. PATENT DOCUMENTS

| | | | |
|---|---|---|---|
| 3,830,691 | 8/1974 | Truesdale et al. | 162/275 |
| 3,839,148 | 10/1974 | Beck | 162/275 X |
| 3,966,544 | 6/1976 | Johnson | 162/275 X |
| 4,087,320 | 5/1978 | Danahy et al. | 198/495 X |
| 4,097,340 | 6/1978 | Pries | 134/180 X |
| 4,261,831 | 4/1981 | Linsenmeyer | 210/341 |
| 4,540,469 | 9/1985 | Lundstrom | 162/277 X |
| 4,611,989 | 9/1986 | Kersting | 198/495 X |
| 4,701,242 | 10/1987 | Scarano et al. | 198/495 X |

Primary Examiner—Harvey C. Hornsby
Assistant Examiner—Frankie L. Stinson
Attorney, Agent, or Firm—Stevens, Davis, Miller & Mosher

[57] ABSTRACT

The present invention provides a novel high pressure water cleaning device. The cleaning device of the present invention provides means to mechanically manipulate a high pressure water nozzle. The invention is particularly suitable for cleaning the drier trays of tunnel driers which are used in rubber manufacturing processes.

4 Claims, 3 Drawing Sheets

HIGH PRESSURE WATER WASHING DEVICE

BACKGROUND OF THE INVENTION

The use of tunnel driers to dry wet material is well known. In a tunnel drier of a known design, a moving drier tray transports wet material through the drier tunnel. Heated air is typically used as a heat source to dry the wet material. After the material exits from the drier tunnel, it is removed from the drier tray as dry product. Tunnel driers with more than one drier tray are also known to those familiar with the art.

One problem with tunnel driers is that there is a tendency for small amounts of dry product to adhere to the drier tray and hence repeatedly cycle through the drier tunnel. This is undesirable because overdried product may become degraded due to excessive heat exposure. For example, one well known use of tunnel driers is to dry synthetic rubber. Small amounts of synthetic rubber sometimes adhere to the drier tray and eventually may become discoloured due to excessive heat exposure. If the discoloured synthetic rubber subsequently breaks loose from the drier tray and mixes with wet product passing through the drier, visible contamination of the dry finished product by the discoloured material results. It is therefore necessary to periodically clean the drier tray to remove accumulations of material that have adhered to it in order to produce a dry finished product of consistently high quality.

One method of cleaning the drier tray is to wash it with water under high pressure. This is typically done by a workman who manually positions a high pressure water nozzle in front of the tray, thus directing a flow of high pressure water to remove the accumulation of adhered material. The pressure of the water should be high enough to efficiently remove the adhered material but it should be low enough to avoid damaging the drier tray. A water pressure of 250–400 atmospheres has been found to be suitable for this process. The drier tray is in motion when it is being cleaned, to allow the workman to clean the tray as it rotates past him. Thus, the workman washes the entire width of the drier tray as it rotates past him.

The workman is unable to immediately view the result of his work due to the effect of water splashing off the drier tray. This is a problem because the workman might miss cleaning a part of the drier tray and not notice it as it rotates past him. As previously noted, the quality of the product being dried can be adversely affected by the material that adheres to the drier tray and, thus, proper cleaning of the tray is important. In addition, the cleaning process is labour intensive and expensive.

SUMMARY OF THE INVENTION

It is an object of the present invention to provide a novel device suitable for washing the drier tray of a tunnel drier with high pressure water. The pressure of the water is typically 250–400 atmospheres.

The present invention thus provides a novel washing apparatus to wash the drier tray of a tunnel drier, said tunnel drier having a fixed outer frame, a drier tray movably mounted within said outer frame and means to move said drier tray longitudinally through said frame, said novel washing apparatus characterized by:

(i) means to control the supply of a high pressure water spray from a high pressure water nozzle;

(ii) a movable cart in which the nozzle is installed;

(iii) means to automatically move the high pressure water nozzle in a horizontal plane within the cart;

(iv) means to control the direction of movement of the high pressure water nozzle within the cart; P (v) a horizontal guidebeam located in front of and being of similar length to the full width of the tray;

(vi) a frame which is fixedly attached to the guidebeam;

(vii) means to drive the cart along said guidebeam;

(viii) means to control the driving of the cart along the guidebeam; and (ix) means to determine when the drier tray has completed one complete rotation in front of the cart.

A preferred embodiment of the present invention is hereinafter described without limitation as to other specific embodiments or attempting to show all forms in which the invention might be embodied.

BRIEF DESCRIPTION OF THE DRAWINGS

Thus FIG. 1 illustrates a sectional view of a known tunnel drier. The moving drier tray (101) transports material to be dried longitudinally through the drier tunnel. The fixed outer frame (103) defines the "tunnel" of the tunnel drier. The direction of rotation of the drier tray (101) is indicated by the arrows (104).

DESCRIPTION OF THE PREFERRED EMBODIMENT

Figure 2:
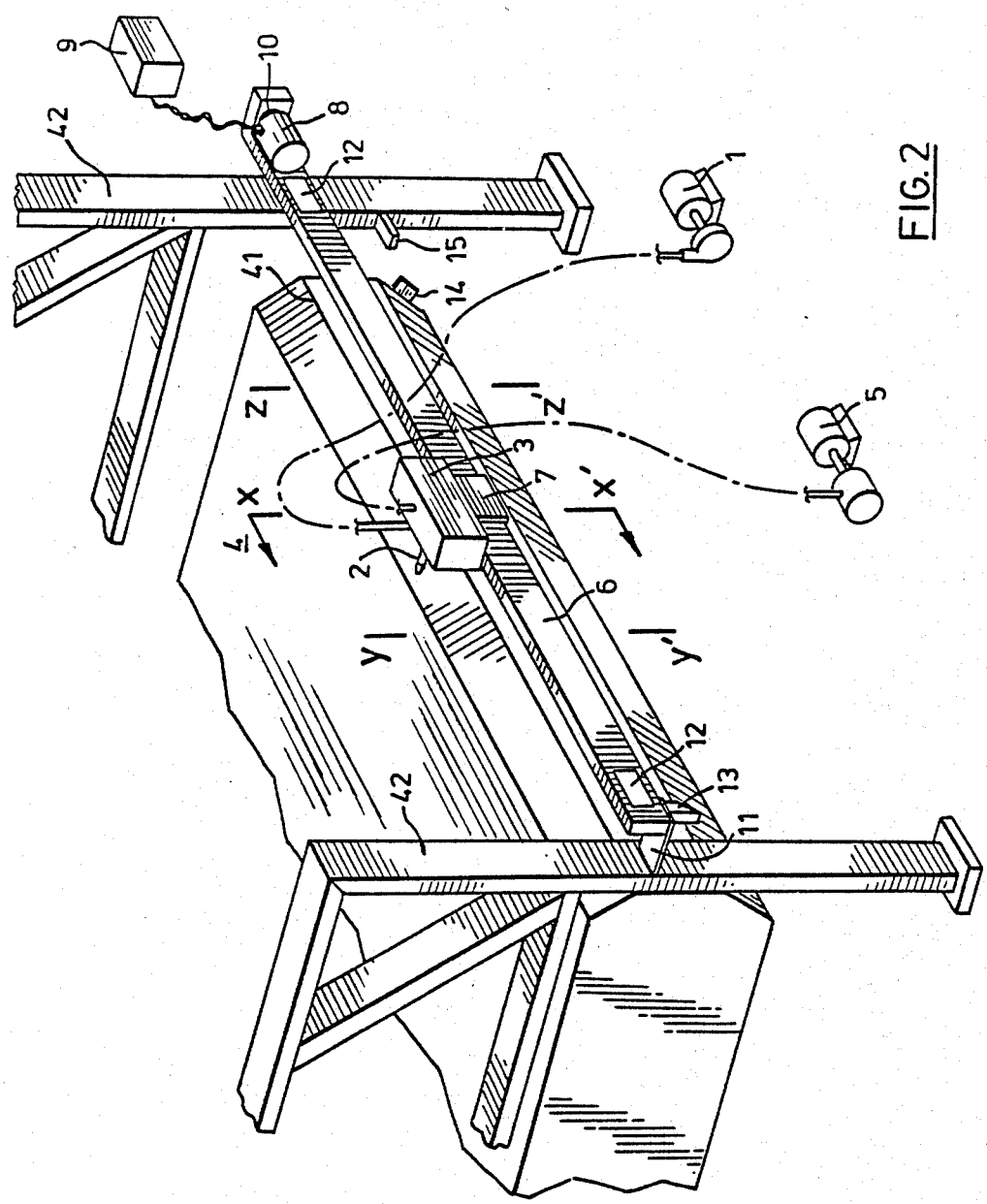
FIG. 2 is an isometric view of a device according to a preferred embodiment of the invention and FIG. 2 also shows part of a known tunnel drier.

A schematic layout of a device according to the present invention is generally shown in FIG. 2.

Essential to the device is a means to controllably supply high pressure water (1) at between 250–400 atmospheres pressure, to a movable high pressure water nozzle (2). A pump capable of discharging water at high pressure is a preferred means to controllably supply said high pressure water. The nozzle is mounted in a cart (3) facing a drier tray (4) of a tunnel drier. The nozzle may be held in a fixed position on the cart or moved in a back and forth motion in a horizontal plane within the cart. Suitable means to move the nozzle within the cart include mechanical means and pneumatic means. FIG. 2 shows suitable pneumatic blower means (5) to provide a driving force to move the nozzle (2) back and forth within the cart (3).

The cart is movably attached to the hollow guidebeam (6). The length of the guidebeam (6) is approximately equal to the width of the drier tray (4) as shown in FIG. 2. The guidebeam (6) is located in front of the edge of the drier tray (41) such that the edge of the drier tray (41) is approximately equidistant from the guidebeam (6) at all points along the length of the guidebeam (6). A distance of 30" to 40" between the guidebeam (6) and the edge of the drier tray (41) is preferred. The guidebeam (6) is fixedly attached to guidebeam frame means (11). Guidebeam frame means (11) may be suitably attached to the tunnel drier housing (42) as shown in FIG. 2. Alternatively, the frame may be a separate structure that is independent of the tunnel drier. The bottom of the cart (7) surrounds a section of the guidebeam (6). The cart is driven along the guidebeam (6) and may travel in either direction on the guidebeam (6). Suitable means to drive the cart is discussed below. Suitable motor means are required to provide power to the drive means. Electric motor means (8) are preferred means to provide power to the drive means. Suitable gear or pulley means (10) to connect the motor means to the drive means are required such that the cart may be driven in either direction along the guidebeam.

Suitable sensing and switching means (12) are located at both ends of the guidebeam. These sensing and switching means detect the position of the cart and provide an electric signal that causes the direction of movement of the cart to be reversed when the cart is detected in a position at either end of the guidebeam. Optical, mechanical or electronic sensing and switching means are suitable. Optical means are preferred. Mechanical stopping means (13) are also provided to prevent the cart from leaving the guidebeam if the cart sensing and switching means (12) fail.

Suitable means to provide signals to stop and start the motor means (8) at specific intervals are provided. Microprocessor means (9) are preferred means to provide said signals. The microprocessor (9) is programmed to provide said signals at the desired intervals.

Optical means to determine when the drier has completed one complete rotation are shown as parts (14) and (15). "Tracer" part (14) is fixedly attached to the tray and thus rotates with the tray. Sensing part (15) senses tracer part (14) as the tracer part (14) rotates past the sensing part (15).

Figure 3:
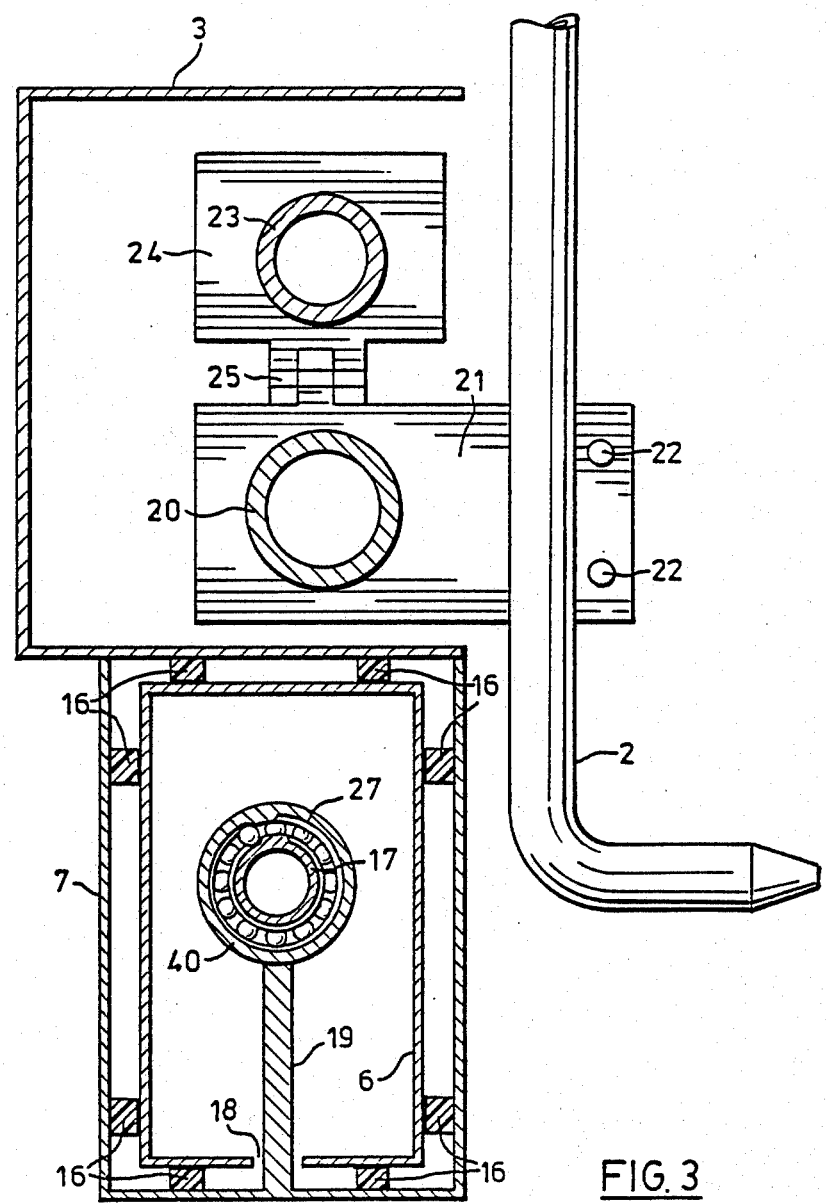
FIG. 3 is a cross-section view through part of the device at the line indicated x—x' on FIG. 1.

FIG. 3 is a cross-section view through the cart and guidebeam at the line x—x' in FIG. 2. This view clearly shows how the bottom of the cart (7) may surround the guidebeam (6). Fraction pads (16) are provided to reduce the friction between the cart and the guidebeam. The friction pads are attached to the cart with suitable attachment means.

As noted above, the cart is driven along the guidebeam by suitable drive means. Suitable drive means include mechanical rack and pinion gears or mechanical ball screw drive means. The mechanical ball screw drive means is preferred. A cross-section view of a mechanical drive screw at x—x' is shown as (17). A threaded tube (40) is located inside the cart and is attached to the cart by attachment means (19). The mechanical drive screw (17) cooperates with the threaded tube (40) to drive the cart. Ball bearings (27) are an integral part of known ball screw drive means. The ball bearings (27) are located in the grooves of the threaded tube (40) and reduce the friction between the threaded tube (40) and the mechanical drive screw (17). Thus, the rotary movement of the drive screw is converted into an axial driving force to drive the cart along the guidebeam. Suitable means are required to provide a torque force to cause the rotary movement of the mechanical ball screw. An electric motor and gear means of the type well known in the art are suitable means to provide said torque force. The direction of rotation of the screw determines the direction of the movement of the cart along the guidebeam. The slotted opening (18) in the guidebeam allows the cart to be driven along the guidebeam by the mechanical drive screw.

The high pressure water nozzle is shown as part (2). A preferred means to move said high pressure nozzle within the cart is pneumatic power. A movable pneumatic cylinder is shown in part (20). Said cylinder (20) is most suitably a telescopic cylinder that telescopes in response to a pneumatic impulse. Attachment part (21) is fixedly attached to the pneumatic cylinder (20). The high pressure nozzle (2) is fixedly attached to the attachment part (21) with attachment pins (22). Hence the attachment part (21) fixedly attaches the high pressure nozzle (2) to the movable pneumatic cylinder (20).

Attachment part (21) is fixedly attached to the connecting part (24) with attachment pin (25). Connecting part (24) surrounds the guiderod (23) and is movably connected to the guiderod (23). Thus the movement of the pneumatic cylinder (20) inherently moves the attachment part (21) which is fixedly attached to the pneumatic cylinder (20). The movement of the attachment part (21) inherently moves both the high pressure nozzle (2) and the connecting part (24) which are both attached to attachment part (21). The movement of the connecting part (24) is guided by the guiderod (23) through the cooperation of the guiderod (23) with connecting part (24). Thus the movement of the pneumatic cylinder (20) inherently moves the high pressure nozzle (2) in a path that is guided by the guiderod (23).

Figure 4:
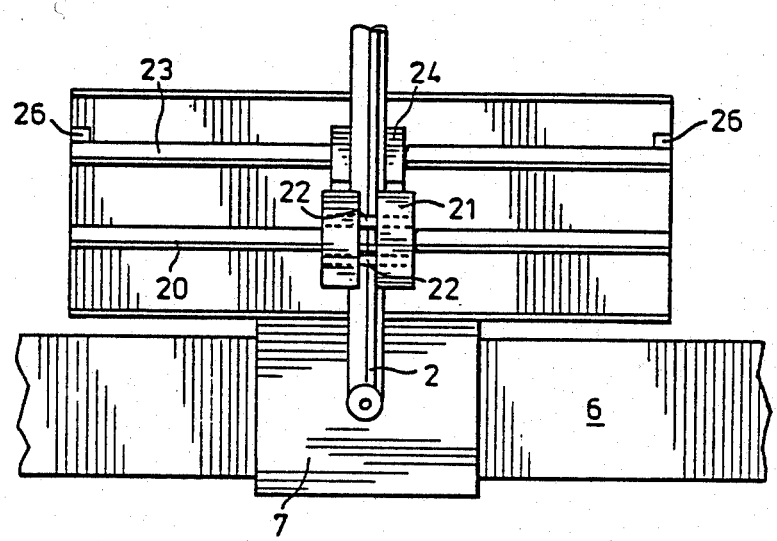
FIG. 4 is a front view of the section of the device shown in FIG. 3 between the lines defined by y—y' and z—z' as shown in FIG. 3.

FIG. 4 is a front view of the cart and a section of the guidebeam. The bottom of the cart (7) surrounds the guidebeam (6).

This view shows a front view of the nozzle (2) which is fixedly attached to the pneumatic cylinder (20) with attachment part (21) and attachment pins (22). As described above, the attachment part (21) and hence the nozzle (2) are fixedly attached to the connecting part (24). The connecting part (24) is movably connected to the guiderod (23) with connecting part (24). Thus, the movement of the pneumatic cylinder moves the nozzle in a horizontal plane defined by the guiderod.

Pneumatic impulses move the pneumatic cylinder and thus direct the movement of the nozzle towards one end of the cart. Adjustable switching means (26) are provided. The adjustable switching means limit the distance the nozzle travels and also switch the direction of the pneumatic impulse to reverse the direction of movement of the nozzle.

The position of the switching means is adjustable. The switching means may be located at both ends of the cart to allow the nozzle to move a maximum distance approximately equal to the width of the cart or the switching means may be located closer together to reduce the distance the nozzle may travel.

It is important to note that the location of the guidebeam (6) is fixed by the frame means shown as part 11 in FIG. 2. It is not contemplated to move the guidebeam (6) during the washing process and therefore the drier tray must be rotated past the guidebeam in order to wash the entire tray. The present invention makes advantageous use of the rotating movement of the drier tray in a continuous tunnel drier. The guidebeam remains in a fixed position during the washing process and the drier tray rotates past the guidebeam. Therefore, the entire drier tray cannot be washed by the device of the present invention until the drier tray has completed at least one rotation.

Suitable means are thus provided to determine the time required for one complete rotation of the drier tray. This may be done with a simple timer; or with a timer that is an integral part of a microprocessor; or with an optical or mechanical device which includes a "tracer" part which is attached to the drier tray and thus rotates with the drier tray and a sensing device to sense said "tracer" part each time said "tracer" part rotates past said sensing device. The optical device is preferred. The "tracer" part is shown as part (14) and the sensing device is shown as part (15) in FIG. 1.

EXAMPLE 1

Particulate matter is washed off the drier tray of a continuous tunnel drier using the apparatus of the present invention while the tray is slowly rotating.

In this example, the high pressure water nozzle is held in a fixed position within the cart. The cart is driven back and forth along the full width of the guidebeam and hence travels a distance approximately equal to the width of the drier tray with each backward and forward stroke.

High pressure water is sprayed from the high pressure water nozzle to wash particulate matter from the drier tray. Thus the full width of the drier tray is washed by high pressure water that is sprayed from the moving cart.

Figure 1:
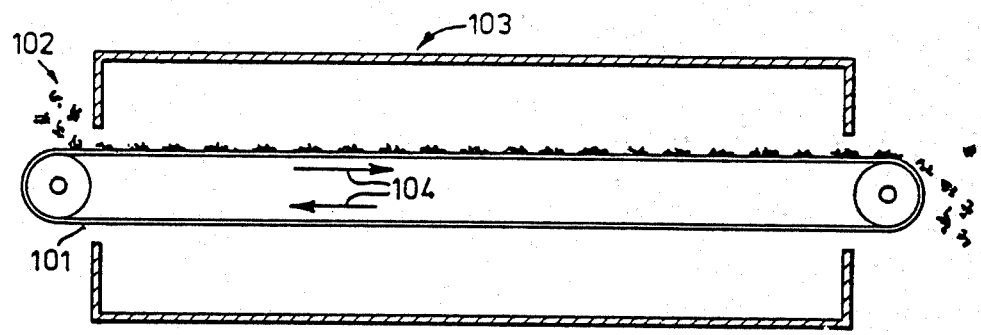
FIG. 1 is a cross-sectional view of a tunnel drier of a type known in the art.

The optical sensing means shown as (12) in FIG. 1 detect the cart when the cart is located at one end of the guidebeam and cause an electric signal to change the direction that the cart is driven. Thus the cart is driven back and forth along the full width of the guidebeam with the optical sensing means providing the electric signs to change the direction that the cart is driven.

The drier tray is slowly rotating during this washing process, thus allowing the entire length of the tray to be washed. The washing process continues for a period of time at least equal to the time required for one complete rotation of the drier tray.

EXAMPLE 2

Particulate matter is washed off the drier tray of a continuous tunnel using the apparatus of the present invention while the tray is slowly rotating. In this example, the cart is held stationary for the time required for one rotation of the drier tray. As the tray rotates past the stationary cart, high pressure water from the nozzle washes the section of the tray directly in front of the cart. Although the cart is held stationary on the guidebeam for a complete rotation of the drier tray, the nozzle is moved back and forth within the cart. Thus, the part of the tray directly in front of the cart is washed by a spray of water from the nozzle which is moving back and forth within the cart, but the cart itself is held stationary on the guidebeam.

To begin the washing process, the drier tray is set in motion and the cart is held in a stationary position on the guidebeam. Pneumatic impulses move the pneumatic cylinder inside the cart, thus moving the high pressure water nozzle. The switches inside the cart change the direction of movement of the pneumatic cylinder and inherently change the direction of the nozzle, thus allowing a back and forth motion of the high pressure nozzle. High pressure water is sprayed from the nozzle, thus washing the section of tray directly in front of the cart with a back and forth movement. The water wash removes particulate matter from the drier tray.

This process washes the tray directly in front of the cart. As the tray rotates past the cart, a strip of the tray is washed. When the tray has completed one rotation, a complete strip of tray approximately equal to the width of the cart has been washed. The sensing means shown as parts (14) and (15) in FIG. 1 are used to time the rotation of the drier tray. After the tray has completed one rotation, a signal from the optical sensing part (15) is sent to the microprocessor. The microprocessor starts the motor to provide power to the mechanical drive screw. The rotation of the drive screw is translated into axial movement of the cart along the guidebeam. The microprocessor also provides a signal to stop the motor after the cart has travelled the desired distance down the guidebeam. Normally the cart is moved an incremental step approximately equal to the width of the cart. However, this distance may be shortened to provide a more thorough cleaning of the tray.

After the cart has travelled along the guidebeam the desired distance, is is then secured in the new position of a period of time corresponding to one rotation of the drier tray. The high pressure nozzle sprays water at the tray to clean the strip of tray directly in front of the cart in the previously described manner.

The above process is repeated for the number of rotations of the drier tray and incremental advances of the cart desired, with each rotation resulting in a strip of the drier apron being washed. Normally the washing is finished when the cart has been advanced along the guidebeam, in the incremental fashion described in this example, the distance from one side of the drier tray to the other.

The washing process described in this example has been found to give excellent results and is preferred to the process described in Example 1.

What is claimed is:

1. A novel apparatus to wash particulate matter from the drier tray of a tunnel driver with high pressure water, said tunnel drier having a fixed outer frame, a drier tray movably mounted within said outer frame and means to move said drier tray longitudinally through said frame, said novel washing apparatus comprising:
   (i) means to controllably supply a movable, high pressure water nozzle with water under 250-500 atmospheres pressure;
   (ii) a movable cart having a fixed guiderod and connecting means which movably connect said fixed guiderod to said water nozzle;
   (iii) means to move said high pressure water nozzle within said cart in a horizontal plane defined by said fixed guiderod;
   (iv) adjustable switching means to control the direction of movement of the high pressure water nozzle within said cart;
   (v) a horizontal guidebeam having a length approximately equal to the width of said drier tray, said guidebeam located approximately 30 to 40 inches from said tray and positioned such that the shortest distance between the guidebeam and the drier tray is approximately equal at all points along the length of the guidebeam;
   (vi) a guidebeam frame which is fixedly attached to said guidebeam;
   (vii) means to drive said cart along said guidebeam;
   (viii) means to control the driving of said cart along said guidebeam; and
   (ix) means to determine when said driver tray has completed one rotation.

2. The apparatus of claim 1 wherein said means to drive said cart along said guidebeam comprises ball screw drive means and motor means to drive said ball screw drive means.

3. The apparatus of claim 2 wherein said guidebeam is fixedly attached to said fixed outer frame of said tunnel drier.

4. The apparatus of claim 1 wherein said particulate matter is synthetic rubber.

* * * * *